United States Patent Office 2,807,538
Patented Sept. 24, 1957

2,807,538

METHOD FOR REMOVING TIN COATINGS

Sidney M. Heins, Chicago, Ill., assignor to Atlantic Chemicals and Metals Co., Chicago, Ill., a corporation of Illinois No Drawing. Application July 18, 1955,
Serial No. 522,857

7 Claims. (Cl. 75—64)

This invention relates to a method for removing metal coatings from other metals and more particularly to a method for removing tin or tin lead alloy coatings from scrap sheet steel such as discarded food containers and the like to render them more amenable to treatment in a blast furnace.

Heretofore, tin plate scrap has been detinned by roasting shredded scrap in a furnace along with a quantity of sand and a small percentage of sodium nitrate at a relatively low temperature. The heated tin plate was then abraded by the sand until a quantity was removed, and the remainder of the coating was removed by the usual alkaline process i. e. caustic soda and sodium nitrate. A disadvantage of this method was that the temperature range employed was insufficient to effect completion of the process within a reasonable period of time and the abrasive action of the sand was inefficient and slow. Also, in this known process the operative temperature was limited because of the use of sodium nitrate which has been found to become practically ineffective at temperatures less than 500° F.

With this in mind a principal object of the invention is to devise a method by means of which tin plate may be efficiently and conveniently removed from sheet steel or the like with sufficient speed to accomplish the desired result economically.

The invention is primarily directed to a method in which the tin is removed at temperatures considerably in excess of 500° F. and in which the final traces of tin are removed by the use of a compound stable at these temperatures.

I have found that at higher temperatures tin coatings are more susceptible to abrasion and consequently are removed more efficiently. According to the present method, the tin plate scrap is initially shredded to a size which is convenient for conveying and which presents sufficient surface area that removal by abrasion is facilitated. The shredded scrap is then placed in a rotary kiln which may be either of the directly or indirectly fire type. A quantity of sand in the neighborhood of 25% of the total weight of the charge is added and, according to the present method, a small quantity of calcium nitrate is then added to the mixture. The temperature within the kiln is then brought up to approximately 600–700° F. while the charge is agitated for effecting abrasion between the sand and the scrap. At these temperatures the abrasive action of the sand is much more rapid and complete and the calcium nitrate remains stable and fully effective to combine chemically with the remnants of the coating to form the metallic oxide and metallic salt.

*Example I*

The tin plate scrap is first shredded so that the pieces are small enough so that convenient surfaces are presented for abrasion and so that conveying is facilitated. The shredded scrap is then placed in a rotary kiln along with a quantity of sand in the neighborhood of 25% of the total charge. To this mixture is then added approximately 1% of calcium nitrate in relation to the weight of the shredded scrap. The temperature within the kiln is then raised to approximately 600° F. while the charge is simultaneously agitated. Agitation of the charge at this temperature is continued for sufficient length of time to completely detin the base metal.

*Example II*

The tin plate scrap is first shredded so that the pieces are small enough so that convenient surfaces are presented for abrasion and so that conveying is facilitated. The shredded scrap is then placed in a rotary kiln along with a quantity of sand in the neighborhood of 25% of the total charge. To this mixture is then added approximately 1% of calcium nitrate in relation to the weight of the shredded scrap. The temperature within the kiln is then raised to approximately 700° F. while the charge is simultaneously agitated. Agitation of the charge at this temperature is continued for sufficient length of time to completely detin the base metal.

*Example III*

The tin plate scrap is first shredded so that the pieces are small enough so that convenient surfaces are presented for abrasion and so that conveying is facilitated. The shredded scrap is then placed in a rotary kiln along with a quantity of sand in the neighborhood of 25% of the total charge. To this mixture is then added approximately 2% of calcium nitrate in relation to the weight of the shredded scrap. The temperature within the kiln is then raised to approximately 600° F. while the charge is simultaneously agitated. Agitation of the charge at this temperature is continued for sufficient length of time to completely detin the base metal.

*Example IV*

The tin plate scrap is first shredded so that the pieces are small enough so that convenient surfaces are presented for abrasion and so that conveying is facilitated. The shredded scrap is then placed in a rotary kiln along with a quantity of sand in the neighborhood of 25% of the total charge. To this mixture is then added approximately 2% of calcium nitrate in relation to the weight of the shredded scrap. The temperature within the kiln is then raised to approximately 700° F. while the charge is simultaneously agitated. Agitation of the charge at this temperature is continued for sufficient length of time to completely detin the base metal.

The tin product from the above process may be recovered by any one of several conventional recovery processes. These processes may embody the chemical treatment of the resulting oxides and stannates and the separation of metallic tin from the sand by smelting. In this connection it is pointed out that the tin, after a period of operation, forms a coating on the sharp edges of the sand particles and thus reduces their abrasive action. When the percentage of tin reaches approximately 50% of the weight of the sand, the sand should be replaced.

I claim:

1. A method for removing tin and tin lead alloy coating from tin plate scrap comprising the steps of shredding the scrap, placing said scrap within a rotary kiln, mixing with the tin scrap a quantity of sand in the approximate amount of 25% of the tin scrap, adding calcium nitrate in the approximate amount of 1% of the weight of the tin scrap, heating the mixture thus formed to approximately 600° F. and maintaining this temperature within the kiln for a predetermined length of time while agitating the mixture to afford abrasion between the tin scrap and the sand and mechanically separating the tin-laden sand and the metal scrap.

2. A method for removing tin and tin lead alloy coating from tin plate scrap comprising the steps of shredding the scrap, placing said scrap within a rotary kiln, mixing with the tin scrap a quantity of sand in the approximate amount of 25% of the tin scrap, adding calcium nitrate in the approximate amount of 1% of the weight of the tin scrap, heating the mixture thus formed to approximately 700° F. and maintaining this temperature within the kiln for a predetermined length of time while agitating the mixture to afford abrasion between the tin scrap and the sand and mechanically separating the tin-laden sand and the metal scrap.

3. A method for removing tin and tin lead alloy coating from tin plate scrap comprising the steps of shredding the scrap, placing said scrap within a rotary kiln, mixing with the tin scrap a quantity of sand in the approximate amount of 25% of the tin scrap, adding calcium nitrate in the approximate amount of 2% of the weight of the tin scrap, heating the mixture thus formed to approximately 600° F. and maintaining this temperature within the kiln for a predetermined length of time while agitating the mixture to afford abrasion between the tin scrap and the sand and mechanically separating the tin-laden sand and the metal scrap.

4. A method for removing tin and tin lead alloy coating from tin plate scrap comprising the steps of shredding the scrap, placing said scrap within a rotary kiln, mixing with the tin scrap a quantity of sand in the approximate amount of 25% of the tin scrap, adding calcium nitrate in the approximate amount of 2% of the weight of the tin scrap, heating the mixture thus formed to approximately 700° F. and maintaining this temperature within the kiln for a predetermined length of time while agitating the mixture to afford abrasion between the tin scrap and the sand and mechanically separating the tin-laden sand and the metal scrap.

5. A method for removing tin and tin lead alloy coating from tin plate scrap comprising the steps of shredding the scrap, placing said scrap within a rotary kiln, mixing with the tin scrap a quantity of sand in the approximate amount of 25% of the tin scrap, adding calcium nitrate in the approximate amount of 1 to 2% of the weight of the tin scrap, heating the mixture thus formed to approximately 600–700° F. and maintaining this temperature within the kiln for a predetermined length of time while agitating the mixture to afford abrasion between the tin scrap and the sand and mechanically separating the tin-laden sand and the metal scrap.

6. A method for removing tin and tin lead alloy coating from tin plate scrap comprising the steps of heating a charge of the shredded scrap and sand to approximately 600–700° F. in the presence of calcium nitrate, and maintaining said charge within said temperature range while simultaneously agitating said charge for a period of time to afford complete removal of the tin plate.

7. A method for removing tin and tin lead alloy coating from tin plate scrap comprising the steps of heating a charge of the shredded scrap and sand to approximately 600–700° F. in the presence of calcium nitrate, and maintaining said charge within said temperature range while simultaneously agitating said charge for a period of time to afford removal of the tin plate by the abrasive action of the sand and the chemical action of the calcium nitrate.

References Cited in the file of this patent
FOREIGN PATENTS 103,836   Great Britain _____ Feb. 15, 1917

OTHER REFERENCES

Chemical Engineers' Handbook, 3rd edition, page 125.